United States Patent [19]

Kasai et al.

[11] Patent Number: 5,478,520
[45] Date of Patent: Dec. 26, 1995

[54] PROCESS FOR INJECTION MOLDING AND APPARATUS THEREFOR

[75] Inventors: Masayoshi Kasai; Hideo Kuroda; Yukio Tamura; Yoshio Shikase; Kouji Kubota, all of Nagoya, Japan

[73] Assignee: Mitsubishi Jukogyo Kabushiki Kaisha, Tokyo, Japan

[21] Appl. No.: 321,476

[22] Filed: Oct. 11, 1994

Related U.S. Application Data

[63] Continuation of Ser. No. 886,166, May 21, 1992, abandoned, which is a continuation-in-part of Ser. No. 603,316, Oct. 25, 1990, abandoned.

[30] Foreign Application Priority Data

Oct. 27, 1989 [JP] Japan ..................... 1-278473
Oct. 27, 1989 [JP] Japan ..................... 1-278474
Oct. 27, 1989 [JP] Japan ..................... 1-278475

[51] Int. Cl.$^6$ .................................. B29C 45/23
[52] U.S. Cl. ................. 264/328.1; 425/562; 425/564
[58] Field of Search ....................... 425/192, 572, 425/550, 562, 563, 564; 264/328.1

[56] References Cited

U.S. PATENT DOCUMENTS

| 4,164,531 | 8/1979 | Shiraki et al. ............ 264/115 |
| 4,519,763 | 5/1985 | Matsuda et al. ........... 425/192 |
| 5,030,076 | 7/1991 | Ebenhofer et al. ......... 264/572 |

FOREIGN PATENT DOCUMENTS

| 2272823 | 12/1975 | France . |
| 2333635 | 7/1977 | France . |
| 1220116 | 6/1966 | Germany . |
| 58-167133 | 10/1983 | Japan . |
| 143626 | 8/1984 | Japan ..................... 425/550 |
| 60-242022 | 12/1985 | Japan . |
| 61-244515 | 10/1986 | Japan . |
| 6121225 | 1/1988 | Japan . |
| 63-13726 | 1/1988 | Japan . |
| 63-94808 | 4/1988 | Japan . |
| 63-182120 | 7/1988 | Japan . |
| 61241114 | 10/1988 | Japan . |
| 63-283922 | 11/1988 | Japan . |
| 63-33733 | 8/1989 | Japan . |

*Primary Examiner*—Tim Heitbrink
*Attorney, Agent, or Firm*—Birch, Stewart, Kolasch & Birch

[57] ABSTRACT

A process and apparatus for effecting injection molding of plastic resin products on an injection molding apparatus including a metal mold composed of a slidable mold element and a fixed mold element defining together the mold cavity, an actuator for sliding the slidable mold element and an injection nozzle for adjusting the nozzle flow path section, which comprises a first molding step of injecting a molten resin into the mold cavity which has been preset by the slidable mold element so as to include a post-compression margin to be compressed afterwards in a second molding step, to effect the injection under a reduced molding pressure, while causing a temperature elevation and, thus, a viscosity reduction of the molten resin, until the mold cavity has been filled up, and a second molding step of compressing the resin so charged in the mold cavity by operating the slidable mold element to compress the charged resin to compensate the post-compression margin, so as to allow an effective pressing force to be imposed onto the charged resin within the mold cavity also after the gate has been sealed.

5 Claims, 9 Drawing Sheets

LOAD-TIME DIAGRAM FOR CONVENTIONAL INJECTION MOLDING MACHINE

LOAD-TIME DIAGRAM FOR INJECTION MOLDING APPARATUS OF THE INVENTION

LOCATION OF SENSORS IN EXPERIMENTAL MOLD
(FOR MOLDING A 200φ DISC)

P1, P2 : LOCATION OF PRESSURE SENSOR

T1 : LOCATION OF TEMPERATURE SENSOR

SENSIBILITY OF WALL THICKNESS, GATE DIMENSION AND INJECTION RATE ON MOLDING PRESSURE REDUCTION

PROCESS FOR INJECTION MOLDING AND APPARATUS THEREFOR

This application is a continuation, of application Ser. No. 07/886,166 filed on May 21, 1992, now abandoned, which is a continuation-in-part of application Ser. No. 07/603,316 filed Oct. 25, 1990, now abandoned.

FIELD OF THE INVENTION

The present invention relates to a process of low clamping pressure injection molding for producing injection-molded plastic products with high dimensional accuracy under a lower molding pressure.

DESCRIPTION OF RELATED ART

Conventional injection molding machines employ high molding pressures ranging from 50 to 100 MPa, so that they reveal disadvantages, such that they often bring about molded products having distorted portions due to high internal stress after the molding, resulting in a lower dimensional accuracy, that an expensive metal mold has to be employed and that the working life of the metal mold is relatively short. For further explaining the circumstances, a typical load-time diagram showing the course of variation of the molding pressure with time in an injection cycle for a conventional injection molding machine is given in FIG. 4. Here, Curves a, b, c and d show the course of variation of the injection pressure, of the inlet pressure of the mold cavity, of the terminal end pressure of the mold cavity and of the clamping pressure, respectively. As seen from the Curves a, b, c and d of FIG. 4, higher pressures are required both for the injection pressure, for the mold internal pressure and for the clamping pressure. This is assumed to be due to a high pressure drop within the narrow mold cavity owing to the forced flow of the molten resin having a higher viscosity, and thus, causing a higher flow resistance upon molding of shaped products which in general have higher L/t-values (i.e. length/wall thickness of the molded article) and thus longer flow paths.

Conventional injection molding machines reveal a considerable unbalance between the mold internal pressures, namely the pressures at the cavity inlet and the cavity terminal end, as shown by the typical load-time curves b and c for the mold internal pressures. As a result, a higher stress may appear in the mold metal due to such unbalance in the internal pressures. Thus, the metal mold of a conventional injection molding machine should have large size with great weight and is expensive, since high strength is required for the material and construction thereof.

In a molding of plastic resin, a compensation of the size reduction incidental to the cooling of the molded article should be incorporated. In an injection molding, however, an imposition of an effective pressure onto the molten resin in the mold cavity becomes hindered when the gate is clogged or sealed, whereby the cavity internal pressure will then be set in an unbalanced state as mentioned above and the molded resin will be cured as such upon cooling. Here, the unbalance of the internal pressure is frozen in the molded article as an internal stress. This may cause defective dimensional stability and occurrence of distortion and sink marks. A useless waste of energy due to occurrence of pressure drop may also be taken into account.

Metal molds made of ZAS (a zinc alloy) employed conventionally for molds for limited production of moldings are apt to be subjected to deformation by internal pressure, formation of flash in the molded articles due to opening or spacing between the parting faces, damage to the mold and decreased working life, though they are available at a price about half as high as that of steel mold (made of, for example, S55C). If such deformation of the mold would be able to be limited to an extent comparable to that expected for a carbon steel mold, a mass production of moldings using a ZAS mold could be realized. A comparison of the data for Young's modulus and the maximum permissible internal mold pressure between ZAS and steel is given in Table 1 below.

TABLE 1

| Young's Modulus and Max. permissible Internal Pressure for Mold Materials | | |
|---|---|---|
| Material of Mold | Young's Modulus (MPs) | Max. permis. Int. Press. (MPa) |
| Steel | 21 | 100 |
| Zn-alloy (ZAS) | 4.5 | 20 |

As seen in Table 1, it is recognized that mass production of moldings would be possible by employing a ZAS mold in place of a steel mold, if the mold internal pressure could be limited to below 20 MPa, since deformation of the mold is reversely proportional to the Young's modulus of the mold material.

Several proposals have been made for processes for injection molding and for apparatuses therefor, such as seen in the Japanese Patent Application Kokai Nos. 167133/1983, 21225/1985 and 241114/1986, without disclosing any solution to the above problems.

SUMMARY OF THE INVENTION

By the present invention, it is contemplated to provide a process and apparatus for effecting injection molding of plastic resin products under a low clamping pressure in which the molding can be realized with a maximum internal pressure below 20 MPa or with a molding pressure of ⅕ of that encountered normally in steel molds, as corresponding to the ratio of Young's modulus of ZAS to that of steel, in order to realize reduction of the investment cost for the mold.

Thus, one aspect of the present invention resides in a process for effecting injection molding of plastic resin products on an injection molding apparatus including a metal mold composed of a slidable mold element and a fixed mold element defining together the mold cavity, an actuator for sliding the slidable mold element and an injection means with an injection nozzle having an adjustable nozzle flow path section, comprising a first molding step of injecting a molten resin into the mold cavity which has been preset by the slidable mold element so as to include a post-compression margin to be compressed afterwards in a second molding step, to effect the injection under a reduced molding pressure, while causing generation of a shearing energy in the injected flow of the molten resin by throttling the nozzle, to effect a temperature elevation and, thus, a viscosity reduction of the molten resin, until the mold cavity has been filled up, and a second molding step of compressing the resin so charged in the mold cavity by operating the slidable mold element to compress the charged resin to compensate said post-compression margin, so as to allow an effective pressing force to be imposed onto the charged resin within the mold cavity also after the gate has been sealed.

Another aspect of the present invention resides in a process for effecting injection molding of plastic resin products on an injection molding apparatus including a metal mold composed of a slidable mold element and a fixed mold element defining together the mold cavity, an actuator for sliding the slidable mold element and an injection means with an injection nozzle, comprising a first molding step of injecting a molten resin into the mold cavity which has been preset by the slidable mold element so as to include a post-compression margin to be compressed afterwards in a second molding step, to effect the injection under a reduced molding pressure, while causing generation of a shearing energy in the injected flow of the molten resin by incorporating a means for throttling the flow path of the molten resin and/or a means for heating the molten resin before being injected into the mold cavity to effect a temperature elevation and, thus, a viscosity reduction of the molten resin, until the mold cavity has been filled up, and a second molding step of compressing the resin so charged in the mold cavity by operating the slidable mold element to compress the charged resin to compensate said post-compression margin, so as to allow an effective pressing force to be imposed onto the charged resin within the mold cavity also after the gate has been sealed.

A further aspect of the present invention resides in a process for effecting injection molding of plastic resin products on an injection molding apparatus including a metal mold composed of a slidable mold element and a fixed mold element defining together the mold cavity, an actuator for sliding the slidable mold element and an injection means with an injection nozzle having an adjustable nozzle flow path section, comprising a first molding step of injecting a molten resin into the mold cavity which has been preset by the slidable mold element so as to include a post-compression margin to be compressed afterwards in a second molding step, to effect the injection under a reduced molding pressure, while causing generation of a shearing energy in the injected flow of the molten resin by incorporating, together with a throttling of the injection nozzle, a means for throttling the flow path of the molten resin and/or a means for heating the molten resin before being injected into the mold cavity to effect a temperature elevation and, thus, a viscosity reduction of the molten resin, until the mold cavity has been filled up, and a second molding step of compressing the resin so charged in the mold cavity by operating the slidable mold element to compress the charged resin to compensate said post-compression margin, so as to allow an effective pressing force to be imposed onto the charged resin within the mold cavity also after the gate has been sealed.

A still further aspect of the present invention resides in an apparatus for effecting injection molding of a plastic resin including a metal mold composed of a slidable mold element and a fixed mold element defining together the mold cavity, an actuator for sliding the slidable mold element and an injection means having an adjustable injection nozzle for adjusting the nozzle flow path section, comprising a means for setting the pertinent position of the slidable mold element relative to the fixed mold element to be determined by taking into account the amount of volume reduction of the molded resin product due to the cooling thereof after the injection molding and a means for adjusting the flow rate and the molding pressure upon each injection cycle in linkage with a means for varying the flow path section of the nozzle for the molten resin, for realizing reduction in the viscosity of the molten resin and, thus, in the pressure drop of the flowing resin within the mold cavity.

A further aspect of the present invention resides in an apparatus for effecting injection molding of a plastic resin including a metal mold composed of a slidable mold element and a fixed mold element defining together the mold cavity, an actuator for sliding the slidable mold element and an injection means having an adjustable injection nozzle for adjusting the nozzle flow path section, comprising a means for setting the pertinent position of the slidable mold element relative to the fixed mold element to be determined by taking into account the amount of volume reduction of the molded resin product due to the cooling thereof after the injection molding and a means for elevating the temperature of the plasticized resin including a means for throttling the flow path of the molten resin to the mold cavity and/or a means for setting a higher temperature of the heater in the screw plasticizing region, for increasing the screw back pressure or for increasing the rate of revolution of the screw, for realizing reduction in the viscosity of the molten resin and, thus, in the pressure drop of the flowing resin within the mold cavity.

A still further aspect of the present invention resides in an apparatus for effecting injection molding of a plastic resin including a metal mold composed of a slidable mold element and a fixed mold element defining together the mold cavity, an actuator for sliding the slidable mold element and an injection means having an adjustable nozzle for adjusting the nozzle flow path section, comprising a means for setting the pertinent position of the slidable mold element relative to the fixed mold element to be determined by taking into account the amount of volume reduction of the molded resin product due to the cooling thereof after the injection molding; a means for elevating the temperature of the plasticized resin including a means for throttling the flow path of the molten resin to the mold cavity and/or a means for setting a higher temperature of the heater in the screw plasticizing region, for increasing the screw back pressure or for increasing the rate of revolution of the screw; and a means for adjusting the flow rate and the molding pressure upon each injection cycle in linkage with a means for varying the flow path section of the nozzle for the molten resin, for realizing reduction in the viscosity of the molten resin and, thus, in the pressure drop of the flowing resin within the mold cavity.

A further aspect of the present invention resides in the cross sectional area of nozzle flow path of molten resin being squeezed by nozzle throttling means so as to shear-heat the resin, thereby lowering its viscosity and injection pressure, whereby the sensitivity of lowering of injection pressure will be decreased by 30–40%. At the same time, the cross-sectional area of the flow path of resin in the metal mold is increased by mold-opening amount increasing means so as to lower the fluid resistance of the resin and its injection pressure, whereby the sensitivity of lowering injection pressure will be decreased by 15–25%. For example, the mold-opening amount is set at 20–50% of the wall-thickness of the molded product. Moreover, injection speed is increased by injection speed increasing means so as to prevent the lowering of the temperature of the resin during the filling operation, and at the same time, to lower injection pressure due to the lowering of the viscosity of the resin due to the increase of shearing speed, whereby the sensitivity of lowering of injection pressure will be decreased by 5–15%. As a result, it is possible to reduce filling pressure by about ⅓, to less than 20 Mpa.

As described above, the injection of the molten resin into the mold cavity can be realized in the process according to the present invention under a reduced molding pressure by employing a two step molding process in which the molten resin is injected, in the first molding step, into the mold cavity set by operating the slidable mold element so as to include a post-compression margin to be compensated by compression in the second molding step, since thereby the pressure drop of the molten resin flowing within the mold cavity is reduced. By throttling the injection nozzle and/or by passing the molten resin through a narrow path of resin flow at a high shearing velocity upon injection, the temperature of the molten resin is elevated by the shearing heat generated, thus causing reduction of the viscosity of the molten resin, and it is made possible to inject molten resin, of which viscosity has been reduced as above and eventually further assisted by a means for elevating the temperature of the molten resin, into the mold cavity with the pressure drop within the mold cavity, and thus, the molding pressure being thus additionally reduced.

By the post-compression of the injected resin by operating the slidable mold element after completion of the injection in the first molding step, an effective pressure will be imposed onto the molded resin even after the gate has been sealed, whereby a molded article of high density with little internal stress can be obtained.

DETAILED DESCRIPTION OF PREFERRED EMBODIMENTS

Below, the invention will be described by way of examples with reference to the figures.

Figure 1:
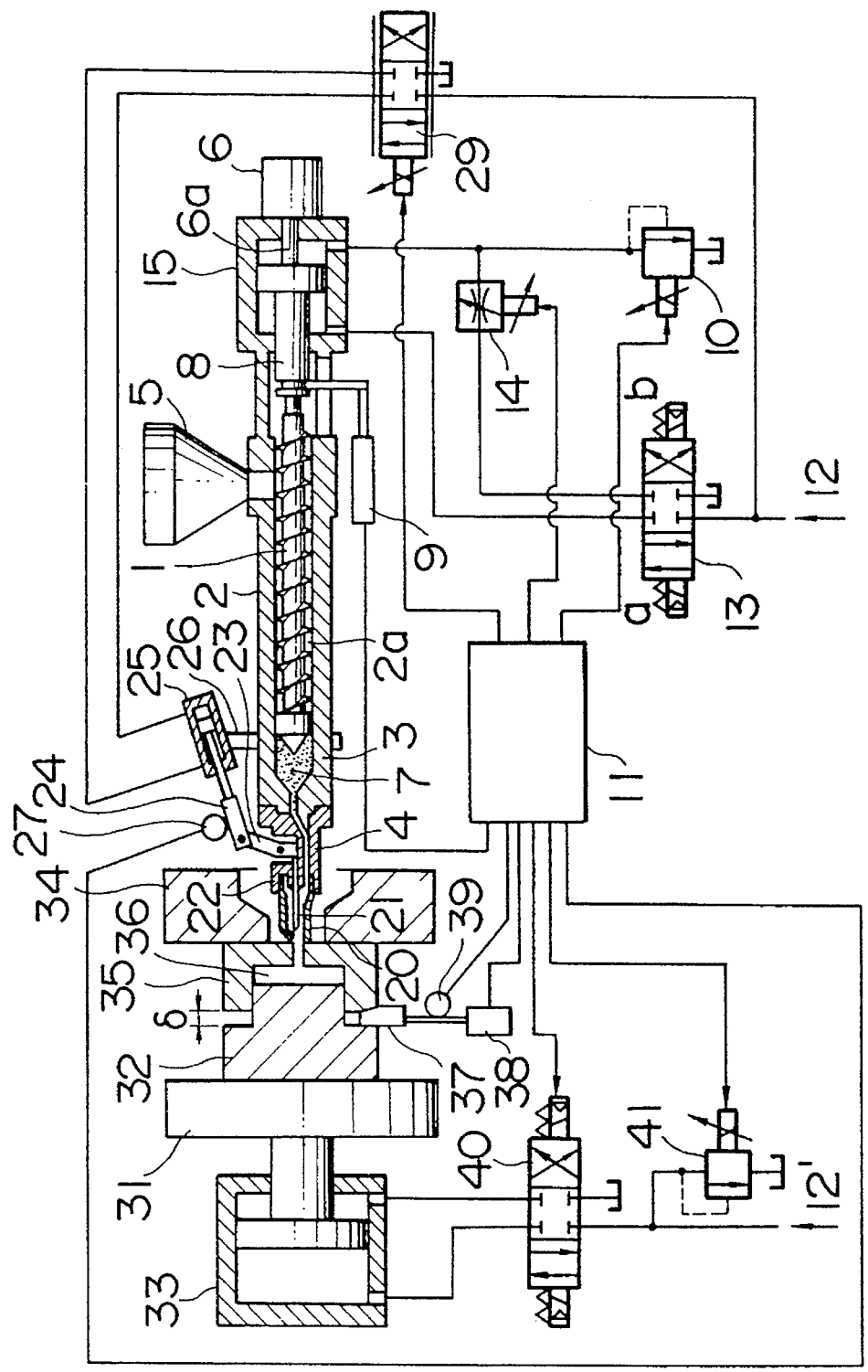
FIG. 1 is a schematic flow chart showing the outlined construction of a first embodiment of the apparatus according to the present invention with its flow line connections.

In the first embodiment shown in FIG. 1, a screw 1 is arranged extending slidably within a closed space 2a defined by a cylinder 2, an end cap 3 and a throttled nozzle 4. The raw resin to be molded is supplied into a hopper 5 from which it is fed to the cylinder 2 and is plasticized and melted by the action of the screw 1 rotated by a hydraulic motor 6 together with heating by a heater (not shown). The melted resin is sent forward by the screw and is stored at the cylinder end as molten resin stock 7. The axis 6a of the hydraulic motor is held in a spline engagement with an injection ram 8 so as to rotate integrally with it, while permitting free axial slide with each other. Screw 1 is equipped with a position sensor 9 and an electromagnetic relief valve 10. The screw 1 is so actuated that the hydraulic fluid is supplied from hydraulic fluid source 12 upon a command from a central control unit 11, to an injection cylinder 15 via an electromagnetic control valve 13 and a flow rate control valve 14, to cause the molten resin stock 7 to be injected into the mold cavity.

Figure 2:
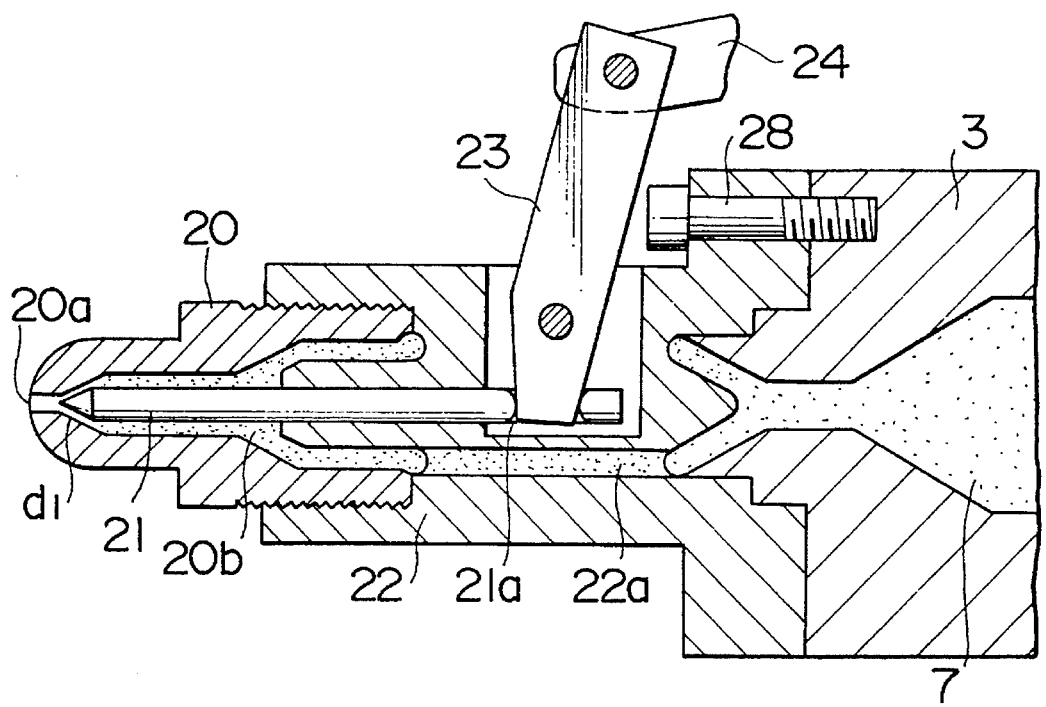
FIG. 2 shows an essential part around the injection nozzle of the apparatus of FIG. 1 in an enlarged axial section.

The particulars of the throttled nozzle 4 are shown in FIG. 2 in an enlarged axial section. The nozzle 20 has inserted in the central flow path a needle pin 21 which is firmly secured on the front end of a valve body 22 communicating via the end cap 3 with the cylinder 2. The needle pin 21 is connected with a lever 23 which is pivotably connected to a connection link 24 through a cut-off 21a provided on the needle pin 21, whereby it is driven by a hydraulic driving means 25 shown in FIG. 1. The hydraulic driving means 25 is mounted fixedly on the cylinder 2 via a bracket 26. A position sensor 27 detects the position of stroke of the connection link 24 and, thus, the position of the forwarding end or the retroceding end of the needle pin 21. The molten resin flows through a plurality of canals 22a (FIG. 2) distributed over the circumference of the valve body 22 and a flow path 20b and discharges out of the nozzle hole 20a. The valve body 22 is mounted on the end cap 3 by screw bolts 28 and the nozzle 20 is screwed in the valve body 22. The needle pin 21 is inserted in the valve body 22 freely slidably with the front end thereof being held so as to leave a gap $d_1$ between it and the nozzle hole inner face and the rear end thereof being fixed to the lever 23 as mentioned above. A servo valve 29 controls the gap $d_1$ by detecting the position of the stroke of the hydraulic driving means 25 producing thereby detection signals which are sent to the central controller 11 in which the signals are converted into actuation signals for sliding the needle pin 21 to set the gap at $d_1$. Here the actuation signals from the detected signals are compared with the signals for a preset standard for $d_0$ and the difference thereof, namely, incremental or decremental signals are supplied to the servo valve 29.

During the plasticizing stage, the gap $d_1$ is closed by forwarding the needle pin 21, in order to prevent outflow of the molten resin of low viscosity after it has been plasticized and melted. During the injection step, the needle pin is retrogressed so as to reach full opening of the gap $d_1$.

Figure 3:
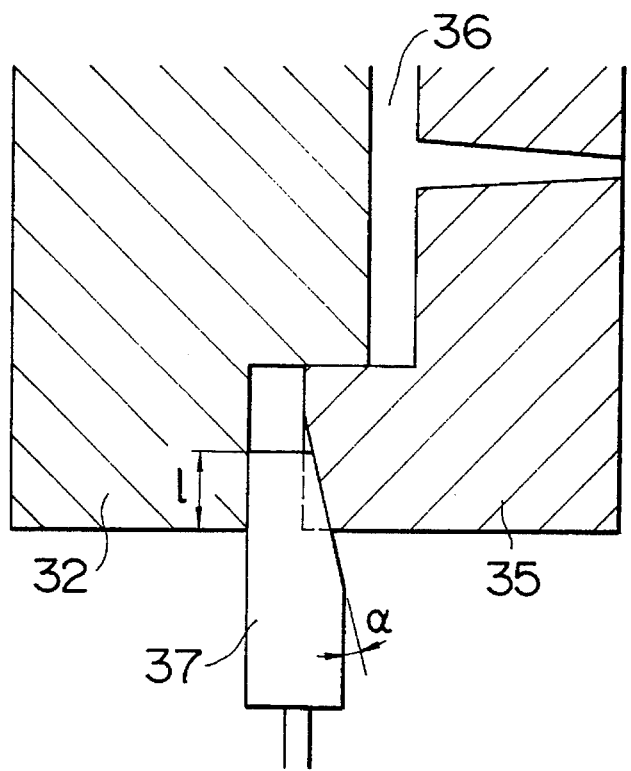
FIG. 3 shows an essential part of the means for setting the position of the slidable mold element of the apparatus of FIG. 1.

A slidable plate 31 (FIG. 1) having fixed thereto a slidable mold element 32 is arranged so as to allow its slide by a clamping cylinder 33. The slidable mold element 32 engages with a fixed mold element 35 mounted fixedly on an immovable plate 34 and defines together a mold cavity 36. Upon molding, the mold elements are brought into engagement in the first molding step so as to thereby effect a primary clamping with a preset cavity space including a post-compression margin δ which will be compensated by compression in the second molding step. In order to set the post-compression margin δ more accurately, a spacer member 37 formed as a wedge is interposed between the slidable mold element 32 and the fixed mold element 35 under control by a driving means 38. To control the insertion stroke of the wedge spacer 37 in between the two mold elements more precisely, a position sensor 39 is provided for detecting the stroke position of the wedge spacer 37. As shown in FIG. 3, the wedge angle α of the spacer 37 is so selected that a minute adjustment of the compression margin δ can be attained by the adjustment of lapping length ι of the spacer with the mold elements. In many cases, several wedge spacers 37 are disposed between the two mold elements (35, 32) under a uniform distribution over the circumference of the mold elements. To effect control of operation of the clamping cylinder 33, an electromagnetic change-over valve 40 and an electromagnetic relief valve are provided, which serve for controlling the rate of supply of the hydraulic liquid from the hydraulic liquid source 12 under control by a control signal from the controller 11.

Motivated by a signal from the controller 11, a highly fluidized molten resin in the resin stock 7 is now injected into the cavity 36 preset with the post-compression margin δ from the nozzle 4 at a high injection velocity to fill the cavity. The controller 11 gives out a signal to the electromagnetic change-over valve 40 and to the electromagnetic relief valve 41, after the injection has been finished, to cause the primary clamping pressure to be reduced. The wedge spacers 37 are retroceded before the gap $d_1$ of the throttled nozzle 4 is closed by a signal supplied to the servo valve 29. Then, in the second molding step, the slidable mold element 32 is operated to compress the cavity 36 at a predetermined secondary clamping pressure for a predetermined period of time by each command signal supplied from the controller 11 to the electromagnetic change-over valve 40 and to the electromagnetic relief valve 41. Now, the molded article is taken out after the mold has been cooled and the molded article has been sufficiently cured, by opening the mold by operating the slidable mold element 32.

Below, the experimental results obtained by carrying out the process according to the present invention are set forth.

MOLDING PRESSURE REDUCTION

Experimental Condition

Using a mold for molding a 200 φ circular disc, a sensibility analysis in an experiment for reducing the molding pressure was carried out under the conditions:

Apparatus: An injection molding machine of 900/220 MPa

Figure 6:
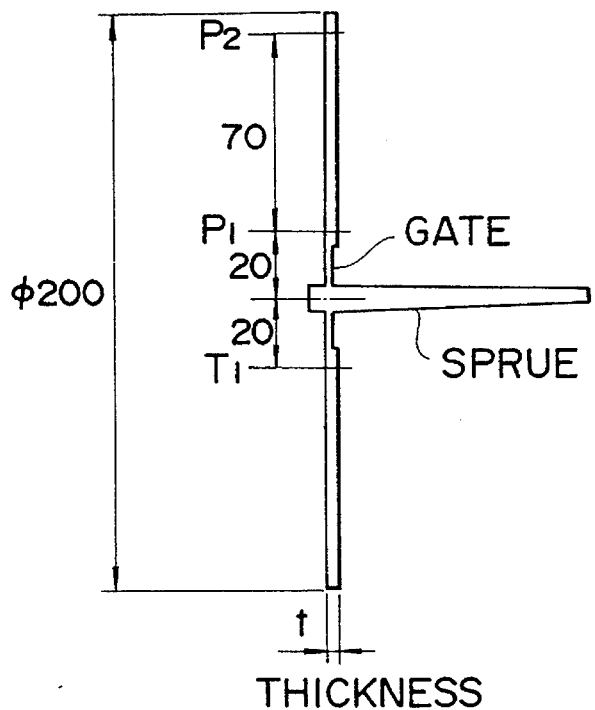
FIG. 6 shows the location of sensors for detecting pressure and temperature in an experimental mold according to the present invention.

Mold: For molding a 200 φ circular disc (See FIG. 6) with a gate size (disc gate) of 0.3, 0.7 and 1.0 mm and a wall thickness of the molded disc of 1.3 mm Resin: Tafrex 210-W (an ABS resin) of the firm Mitsubishi Monsanto Chemical Co.

Molding: Mold temperature of 50°, 100° and 130° C. Resin temperature of 210°, 250° and 290° C. Injection rate at 50, 100, 200 and 500 cm³/sec Using a mold for 200 φ circular disc, a mold internal pressure was detected at two distant positions ($P_1$ at the entrance of the cavity and $P_2$ at the cavity terminal end) and the resin injection temperature was observed. "Molding pressure" is defined as the pressure at the cavity entrance upon completion of the injection (at the occasion at which the cavity terminal end pressure reaches zero).

Experimental Results

In this experiment, no appreciable difference of the sensibility on the mold temperature was recognized. Assuming the gate dimension (wall thickness of the molded article), the resin temperature and the injection rate as the explanatory variables and the molding pressure as the characteristic value, each result obtained for each experimental condition was analyzed by "composite variables multiple regression analysis". By employing the resulting multiple regression formula, each characteristic value for each variation of the explanatory variables is re-calculated, whereby the sensibility of each explanatory variable on the reduction of the molding pressure can be determined. The results of analysis of the sensibility for the gate dimension, for the wall thickness of the molded article and for the injection rate are given as a graph in FIG. 7. Taking a value of wall thickness of 1 mm and a value of gate dimension of 0.7 mm as standards, the course for reducing the observed value of the molding pressure of 50 MPa to a value of 20 MPa is as follows.

Figure 7:
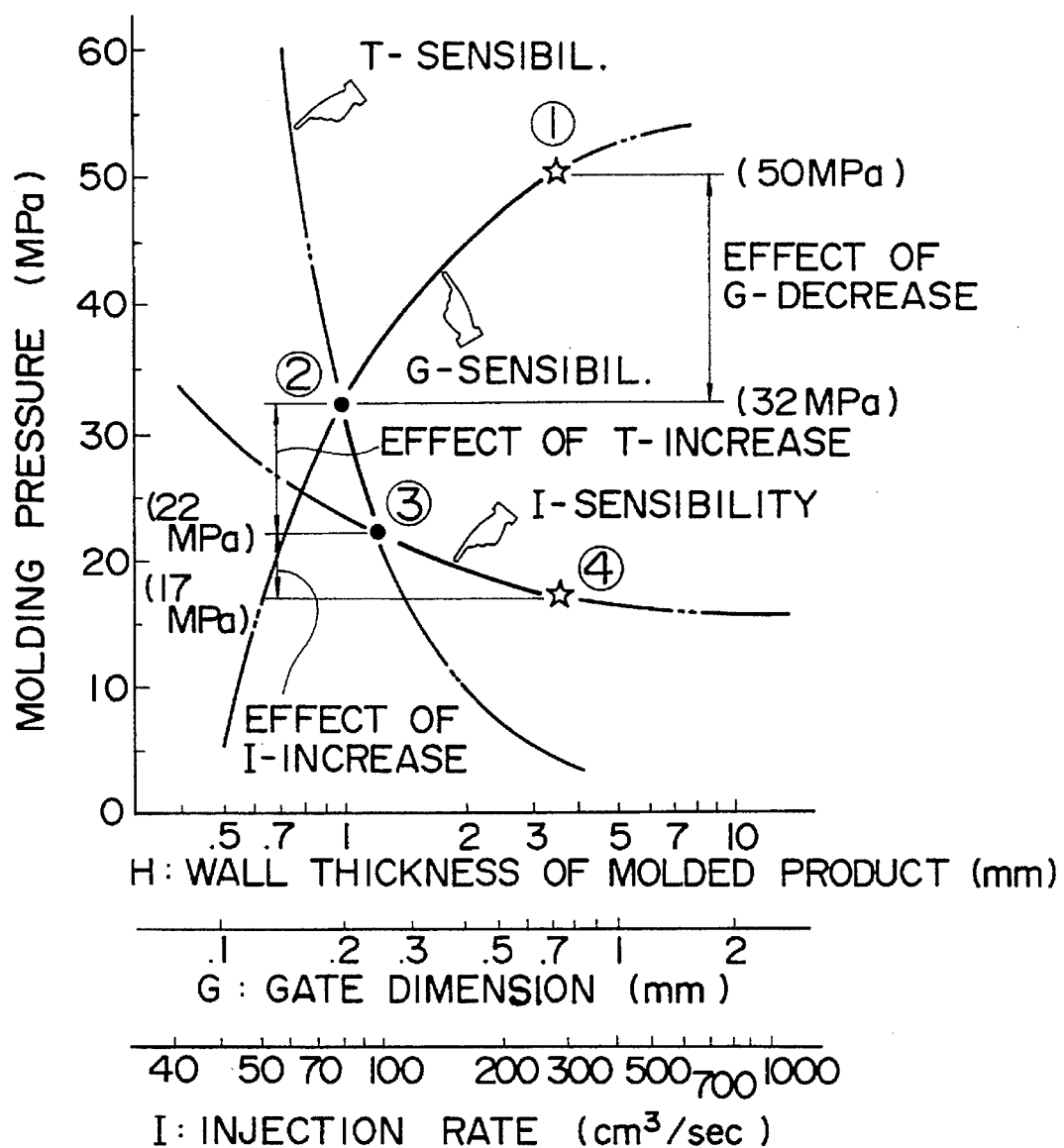
FIG. 7 is a chart showing the sensibilities of wall thickness of the molded article, gate dimension and injection rate on the reduction of molding pressure.

First, by causing heat generation by throttling the gate dimension from 0.7 mm to 0.2 mm, the molding pressure can be reduced from 50 MPa to 32 MPa (from point ① to point ② on the diagram of FIG. 7, along the dashed line marked G-SENSIBIL.) (effect of gate throttling). Second, by increasing the wall thickness of the molding from 1 mm to 1.2 mm, the molding pressure can be reduced from 32 MPa to 22 MPa (from point ② to point ③ on the diagram, along the dashed line marked T-SENSIBIL. in FIG. 7 (effect of wall thickness increase). Third, by increasing the injection rate from 100 cm³/sec to 300 cm³/sec, the molding pressure can be reduced from 22 MPa to 17 MPa (from point ③ to point ④ on the diagram along the dashed line marked I-SENSIBILITY in FIG. 7 (effect of injection rate increase). Thus, a final molding pressure lower than 20 MPa is attainable.

In the above molding pressure decreasing effects, the items 1 and 3 correspond both to a resin temperature elevation effect due to the heat generation from shearing energy upon passing the molten resin through the gate. While the above experiments were carried out by throttling the gate of the mold, it is evident that the same effects can be attained by throttling the nozzle. Here also, it is possible to reduce the molding pressure from 50 MPa to 20 MPa.

Compression Molding after the Injection

Figure 8:
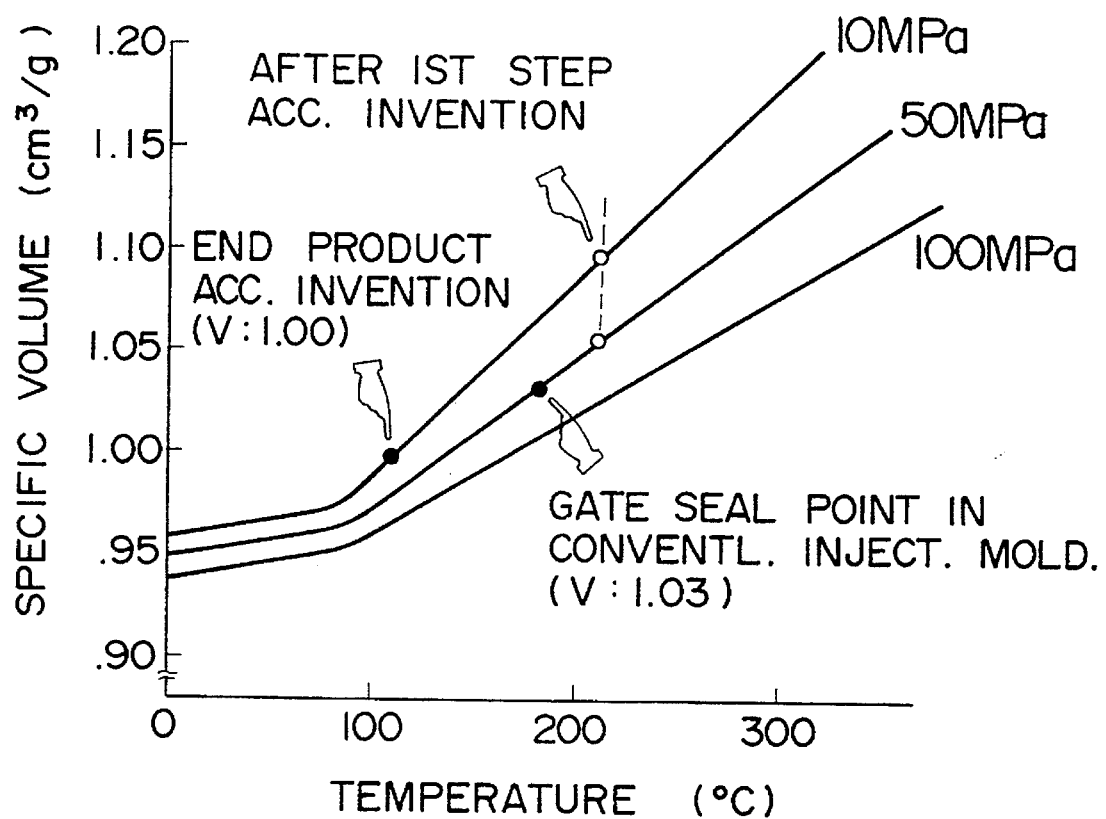
FIG. 8 is a PvT diagram of injection molding for an ABS resin.

Using an ABS resin "Tafrex 210", a PvT variation curve was obtained which is shown as PvT diagram in FIG. 8. Since no effective pressure will be imposed, after the gate has been clogged or sealed, onto the mold cavity even if the injection was effected at a resin temperature of 210° C. while maintaining a pressure of 50 MPa in the case of injection molding, the specific volume is determined by the time until the gate is sealed. In the case shown in FIG. 8, the specific volume amounted to 1.032 cm³/g. On the other hand, by effecting a post-compression molding in the second molding step after the first molding step of low pressure injection according to the present invention, a final specific volume of 1.0 cm³/g can be attained even by employing a low molding pressure of, for example, 10 MPa, by pressing the injection molded heat resistant ABS resin at a thermal deformation temperature of 110° C., since an effective pressure can be imposed onto the molded resin at temperatures up to a temperature near the thermal deformation point. In this manner, a high density molded article having a density even higher than that of the injection molded article can be obtained.

Figure 9:
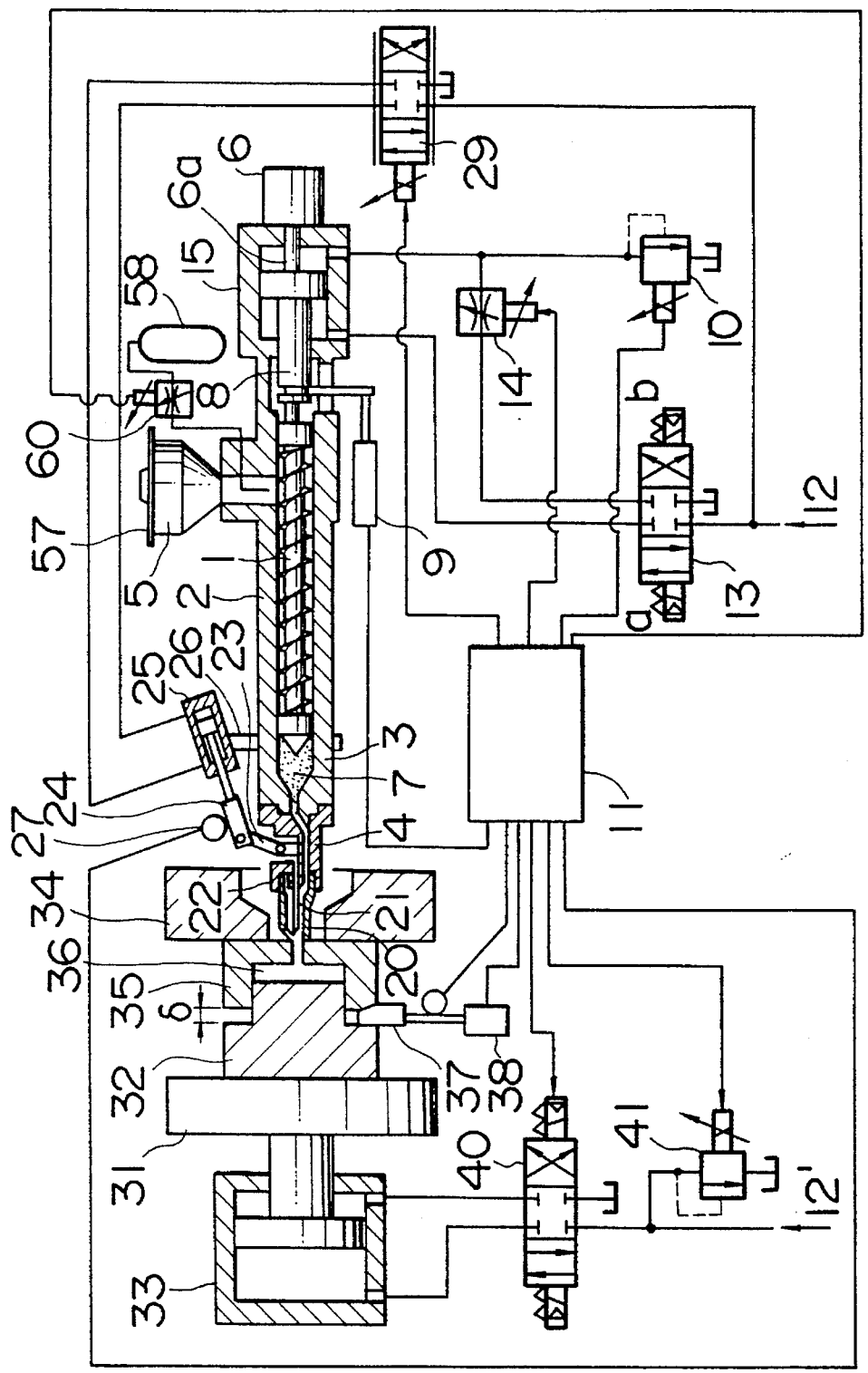
FIG. 9 is a schematic flow chart showing the outlined construction of a second embodiment of the apparatus according to the present invention with its flow line connections.
Figure 10:
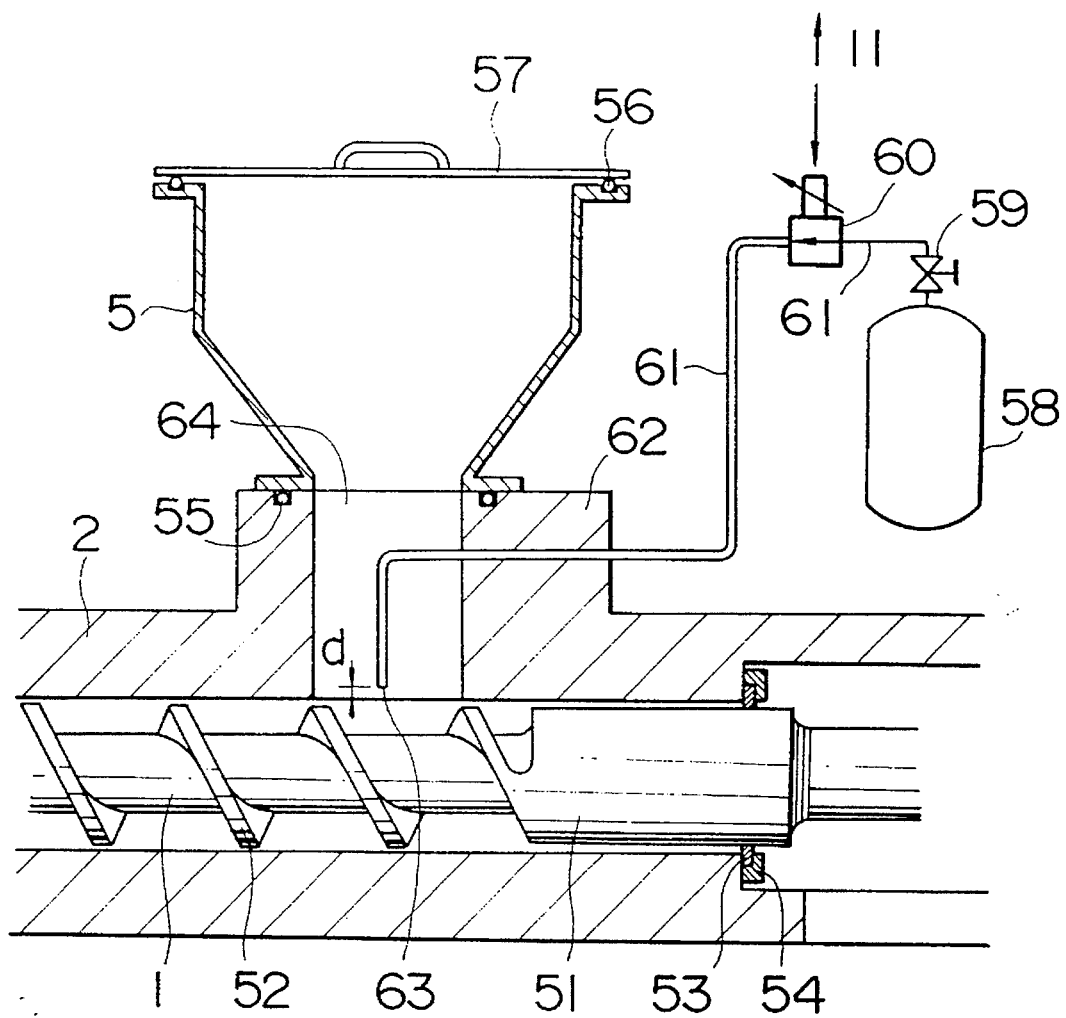
FIG. 10 shows the essential part for the second embodiment apparatus of FIG. 9 in an enlarged section.

FIGS. 9 and 10 illustrate the second embodiment of the process according to the present invention. When the plasticizing is realized at high temperatures, a danger of occurrence of deterioration of the material properties of the molten resin is to be expected, since the resin is subjected to high temperature for considerable periods of time, causing oxidative deterioration of the resin. In order to prevent such an oxidative deterioration of the material, an oxidative deterioration preventing means may be incorporated in the injection molding apparatus as shown in FIG. 1, which is illustrated by its fundamental construction in FIG. 9, wherein the same elements as those shown in FIGS. 1 and 2 are denoted with the same reference numerals.

FIG. 10 is an enlarged sectional view of the second embodiment of the present invention of FIG. 9.

In the example shown in FIG. 10, the shaft sealing portion 51 of the screw 1 has the same diameter with the screw flight 52. To attain a gas tightness, a packing 53 is fitted to the cylinder 2 by a packing gland 54 through bolts (not shown). In order to keep the gas tightness between the cylinder 2 and the hopper 5 and between the hopper 5 and the hopper cover 57, O-rings 55 and 56 are arranged. In order to maintain a nitrogen atmosphere around the hopper area, a nitrogen gas bomb 58 is employed with a stop valve 59 and a flow rate control valve 60. A nitrogen gas conduit 61 is guided through the hopper cylinder 62 and is connected to a nitrogen gas nozzle 63. The nozzle 63 is disposed at a position distant from the screw 1 by a gap d. The stop valve 59 serves to shut up the line upon exchange of the gas bomb 58.

In a continuous molding operation, the hopper portion 64 is filled with nitrogen gas by flowing nitrogen gas at a constant rate operated by the command signal from the central controller 11, whereby oxidative deterioration of the molten resin is prevented.

Figure 4:
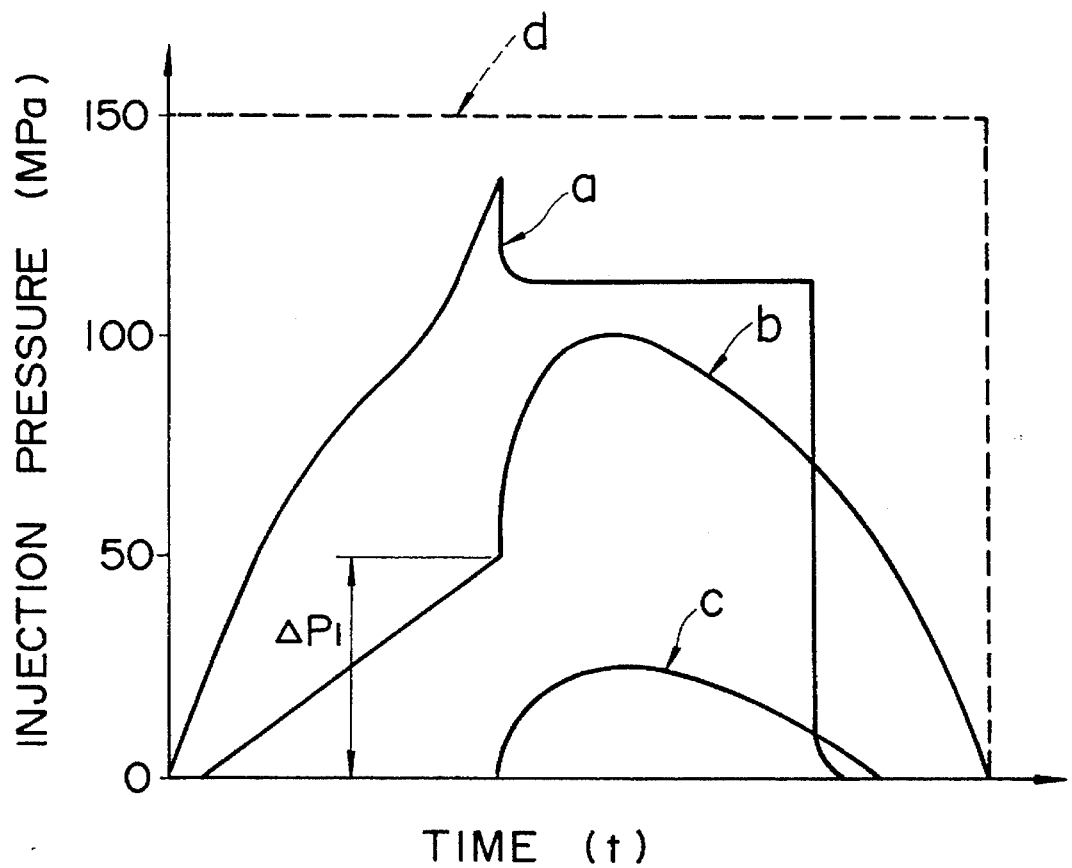
FIG. 4 is a load-time diagram for a conventional injection molding machine.
Figure 5:
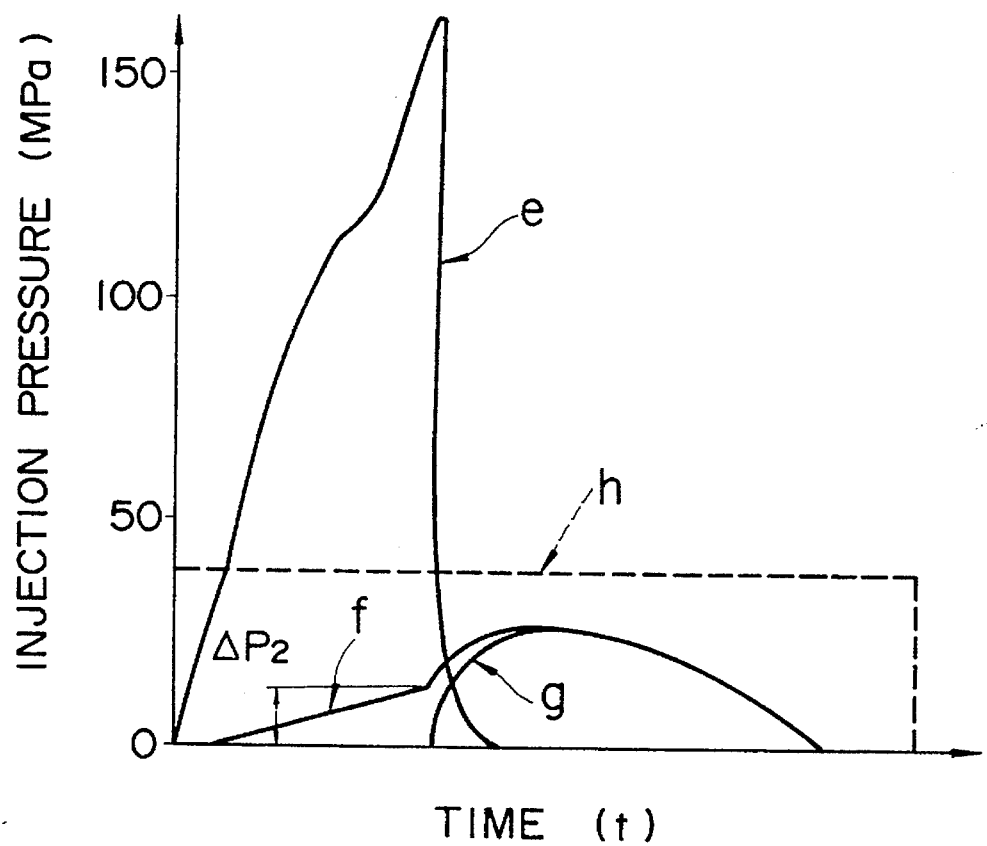
FIG. 5 is a load-time diagram for an apparatus according to the present invention.

By the process according to the invention, the cavity entrance pressure can be considerably reduced, whereby a load-time relationship as shown in FIG. 5 is attained. In FIG. 5, curves e, f, g and h show the course of variation of the injection pressure, the entrance pressure of the mold cavity, the terminal end pressure of the mold cavity and the predetermined post-compression pressure, respectively. Comparing the pressure drop $\Delta p_2$ (FIG. 5) inside the cavity in this embodiment with $\Delta p_1$ (FIG. 4) of the conventional process, it is seen that a considerable decrease in the pressure drop is achieved by the present invention due to the reduction in the viscosity of the molten resin. In addition, the unbalance of the cavity entrance pressure with the cavity terminal end pressure is also eliminated almost completely. During the post-compression at a predetermined pressure h of the low pressure-injection molding by the slidable mold element after completion of the injection, only a little difference between the entrance pressure f and the terminal end pressure g exists, so that no excessive unbalance in the internal pressure occurs. Due to the lower pressure difference between the entrance and the terminal end of the cavity, a relatively low compression force is required, which contributes to an economization of energy consumption.

By the process according to the invention, it is possible to effect the injection molding under a lower cavity entrance pressure and to carry out the post-compression after the injection by a lower compression force, so that it is possible to use a ZAS mold to effect such an injection molding.

By the process of the present invention, a large reduction of the molding pressure, for example, from 50 MPa to 17 MPa, namely below 20 MPa, by incorporating a mold cavity thickness increasing effect by injecting, in the first step, the molten resin into the mold cavity held at a preset cavity space including the post-compression margin to be compensated afterwards in the second step and a resin temperature increasing effect due to a heat generation by shearing energy caused by throttling of the injection nozzle or of the resin flow path, due to employment of high temperature plasticizing and due to employment of high-speed injection. After carrying out the post-compression in the second step following the first step of low pressure injection, a molded article having higher dimensional stability can be obtained even under a lower compressive pressure of, for example, 10 MPa. Thus, in the process according to the present invention, a considerably lower clamping force as compared with the conventional practice can be employed. Therefore, it is now made possible by the process according to the present invention to realize injection molding under lower pressure than the conventional technique, so that employment of a mold of ZAS (a zinc alloy), which was heretofore not possible for mass production of injection molded articles, becomes now possible for such mass production, bringing about a reduction in the investment cost for the mold, lowering of energy consumption and reduction of the scale or size as well as the installation space of injection molding apparatus due to employment of the lower clamping force.

We claim:

1. A method for molding plastic resin in a zinc alloy mold, comprising the steps of:

providing an adjustable zinc alloy mold cavity including means for increasing and decreasing an opening of said adjustable mold cavity by establishing a pre-compression mold cavity opening amount at least 20% greater than a post-compression mold opening amount;

delivering a resin to cylinder screw:

plasticizing said resin in said cylinder screw for providing a molten resin;

injecting said molten resin from said cylinder screw into said adjustable mold cavity through an adjustably throttled injection nozzle, wherein an injection rate and said throttled injection nozzle are set such that a filling pressure of resin is less than 20 MPa and said adjustable mold cavity is open to a pre-compression mold cavity amount;

compressing the injected resin by decreasing the opening of said adjustable mold cavity to said post-compression mold opening amount, wherein a compressive pressure is less than 20 MPa.

2. The method according to claim 1, further comprising the step of providing a nitrogen gas supply during said step of delivering resin to the cylinder screw for preventing oxidization of the resin.

3. An apparatus for molding plastic resin by injecting comprising:

a zinc alloy mold having an adjustable opening;

mold-opening increase means for increasing the opening of said zinc alloy mold before resin injection, by establishing a pre-compression mold-opening amount at least 20% greater than a wall thickness of a post-compression molded product;

compression means for adding mold-fastening pressure to a molded product after resin injection, wherein said mold-fastening pressure is less than 20 MPa;

a nozzle throttling means for adjusting an injection nozzle opening;

means for increasing resin injection speed; and means for increasing resin temperature at a screw plasticizing region provided with countermeasure for prevention of oxidation of resin, wherein said nozzle throttling means, said resin injection speed, and said resin temperature each contribute to provide a filling pressure of resin in the zinc alloy mold at less than 20 MPa through said nozzle throttling means.

4. The apparatus according to claim 3, wherein the throttling amount of said nozzle throttling means is a resin outlet aperture having a diameter of less than 0.2 mm.

5. The apparatus according to claim 3, wherein a nitrogen gas supply inlet is provided at a resin supply opening of a screw plasticizing region for preventing oxidation of the resin.

* * * * *